Figure 1:
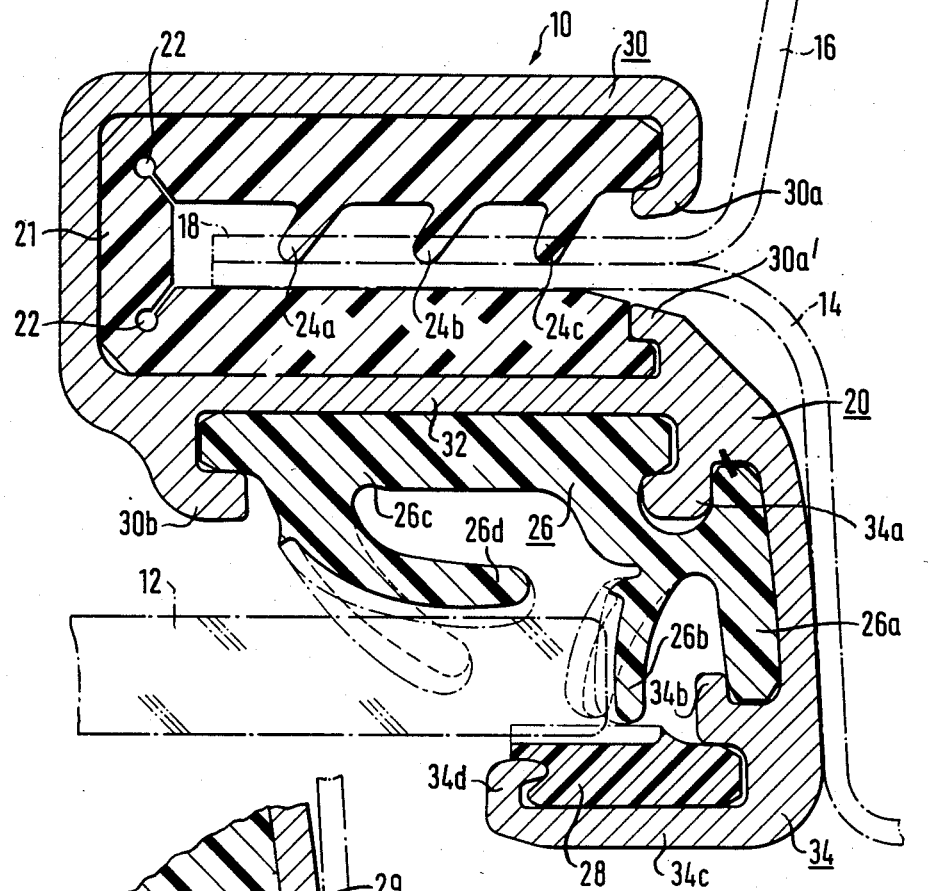

United States Patent [19]

Brocke

[11] Patent Number: 4,614,061
[45] Date of Patent: Sep. 30, 1986

[54] DEVICE FOR GUIDING AND HOLDING A WINDOW PANE IN A MOTOR VEHICLE

[75] Inventor: Rolf Brocke, Wangen, Fed. Rep. of Germany

[73] Assignee: Metzeler Kautschuk GmbH, Munich, Fed. Rep. of Germany

[21] Appl. No.: 674,067

[22] Filed: Nov. 23, 1984

[30] Foreign Application Priority Data

Nov. 23, 1983 [DE] Fed. Rep. of Germany ....... 3342362

[51] Int. Cl.$^4$ ............................................. E06B 7/16
[52] U.S. Cl. ....................................... 49/440; 49/490; 49/495; 49/489
[58] Field of Search ................. 49/440, 441, 490, 491, 49/484, 485, 489

[56] References Cited

U.S. PATENT DOCUMENTS

| | | | |
|---|---|---|---|
| 3,420,002 | 1/1969 | Kondolf | 49/440 |
| 4,409,756 | 10/1983 | Audenino et al. | 49/490 X |
| 4,457,111 | 7/1984 | Koike | 49/441 |
| 4,496,186 | 1/1985 | Tuchiya et al. | 49/491 X |

Primary Examiner—Kenneth Downey
Attorney, Agent, or Firm—Herbert L. Lerner; Laurence A. Greenberg

[57] ABSTRACT

A device for guiding and holding an edge region of a window pane to body parts of a motor vehicle, includes a one-piece metal profile having a U-shaped clamping region and a window pane guiding region, a first rubber profile disposed in the U-shaped clamping region for surrounding the body parts, and at least one second rubber profile disposed in the window pane guiding region for guiding and retaining the edge region of the window pane.

13 Claims, 2 Drawing Figures

U.S. Patent  Sep. 30, 1986  4,614,061

DEVICE FOR GUIDING AND HOLDING A WINDOW PANE IN A MOTOR VEHICLE

SPECIFICATION

The invention relates to a device for guiding and holding a window pane in a motor vehicle, including profiles formed of elastomer material clamped to corresponding body parts of a motor vehicle, which has recesses formed therein for retaining the edge of the window pane.

Such devices are used especially for guiding and holding the side window panes of motor vehicles, wherein the actual guiding and holding is effected by direct contact between profiles formed of elastomer material, in particular rubber profiles, and the edge of the window pane, so that reliable guidance of the window pane is guaranteed without any danger to its sensitive surface. In spite of the numerous research and development efforts carried out in this area, the connection of such a device to the chassis or body parts of the vehicle still presents problems. For instance, this connection can be made by cementing the corresponding rubber profile to the respective chassis part, but this type of assembly is cumbersome and uneconomical.

Furthermore, it is known in the art to use so-called "compound profiles", i.e. profiles with a soft sealing portion and a clamping portion of leather-hard rubber. However, the manufacture of these compound profiles is very costly and complicated, and consequently uneconomical. Another factor to be dealt with is that these profiles must be manufactured with very close tolerances, because they must be fitted exactly onto the respective chassis or body parts.

Additionally, conventional rubber profiles can be provided with steel inserts which produce the required clamping forces. However, in this case the danger exists of the rubber layer wearing off due to the friction between the rubber and the body or chassis part, and direct contact between the body or chassis part and the steel insert may occur. Obviously, this contact point is especially likely to corrode and rust.

Another problem which arises with such connections lies in the fact that due to the development of streamlined car bodies, it is desirable to make the outer surface of the window pane flush with the outer surface of the car body, as far as possible; this means that the outer surface of the rubber profiles for guiding and holding the window should protrude as little as possible, which cannot be achieved with the conventional constructions.

In general, such rubber profiles are covered with an additional metal layer, which is partly for decoration and partly serves as a protection from outside influences. This requires an additional operating step, which in general makes the manufacture and assembly of the conventional rubber profiles very complicated.

It is accordingly an object of the invention to provide a device for guiding and holding a window pane in a motor vehicle, which overcomes the hereinafore-mentioned disadvantages of the heretofore-known devices of this general type.

In particular, the device should be easily manufactured and assembled, and easily removed, such as for repair work; it should make the use and additional assembly of a decorative strip of metal superfluous; and finally it should permit the outer surface of the window pane to be almost flush with the outer surface of the car body.

With the foregoing and other objects in view there is provided, in accordance with the invention, a device for guiding and holding an edge region of a window pane to body parts or a chasis of a motor vehicle, comprising a one-piece metal profile having a U-shaped clamping region and a window pane guiding region, a first rubber profile interposed between the U-shaped clamping region and the body parts which it surrounds, and at least one second rubber profile disposed in the window pane guiding region for guiding and retaining the edge region of the window pane.

In accordance with another feature of the invention, the window pane guiding region has at least one recess formed therein in which the second rubber profile is disposed.

In accordance with a further feature of the invention, the metal profile is an extruded aluminum profile produced by a powder metallurgy process. It is most economical to produce the profile of aluminum by extrusion or in a powder metallurgy process. On one hand, the metal profile provides the required mechanical strength, especially for the actual clamping region, and on the other hand it simultaneously serves as a protective and decorative strip which is visible from the outside, so that no additional assembly work for attaching the additional decorative strip is required.

In accordance with an added feature of the invention, the U-shaped clamping region and the first rubber profile have interlocking U-shaped contours which are form-lockingly interconnected, and the first rubber profile is also U-shaped and has deformable fastening lips formed thereon. On one hand, these rubber profiles retain the respective part of the body or chassis of the vehicle, and on the other hand they guide and hold the edge of the window pane, so that a direct metal to metal contact cannot occur. Due to the very high deformation resistance of such a metal profile sufficienly high clamping and guiding forces are also generated, so that the exact holding and guidance of the window pane is assured. At the same time, the outwardly visible part of the metal profile serves as a decorative strip which is more wear resistant than the frequently-used plastic layers. Additionally, the outer surface of the window pane can be disposed almost flush with the outer surface of the car body, since relatively thin metal profiles already generate sufficiently high guidance forces.

The rubber profiles can be inserted, "buttoned" or squeezed into the respective recesses of the rubber profile, resulting in a simple assembly and thus in an easy mounting operation on the vehicle. The metal profile with the inserted rubber profiles can be directly assembled to the vehicle on the assembly line, so that a uniform fit in the vehicle door is always achieved due to the mechanical strength of the metal profile.

In accordance with an additional feature of the invention, the first rubber profile has incisions formed therein facilitating insertion into the U-shaped clamping region.

In accordance with again another feature of the invention, the edge region of the window pane has inner, outer and side portions, the window pane guiding region has two recesses formed therein locking or form-locking the at least one second rubber profile in place, and the at least one second rubber profile has two sealing lips formed thereon each making contact with a respective one of the portions of the window pane.

In accordance with again a further feature of the invention, the window pane guiding region has a third recess formed therein, and the at least one second rubber profile is formed in one piece and has a rubber plate locked in or form-lockingly disposed in the third recess and bearing against the outer portion of the window pane.

In accordance with a concomitant feature of the invention, the window pane guiding region has a third recess formed therein, and the at least one second rubber profile is in the form of two profiles including a plate-shaped rubber part locked in or form-lockingly disposed in the third recess and bearing against the outer portion of the window pane.

Other features which are considered as characteristic for the invention are set forth in the appended claims.

Although the invention is illustrated and described herein as embodied in a device for guiding and holding a window pane in a motor vehicle, it is nevertheless not intended to be limited to the details shown, since various modifications and structural changes may be made therein without departing from the spirit of the invention and within the scope and range of equivalents of the claims.

Figure 2:
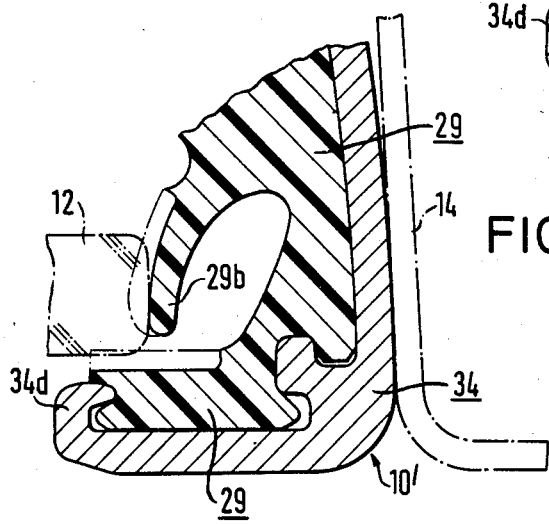

The construction and method of operation of the invention, however, together with additional objects and advantages thereof will be best understood from the following description of specific embodiments when read in connection with the accompanying drawings, in which:

FIG. 1 is a diagrammatic, cross-sectional view of a device for guiding and holding a window pane in a motor vehicle, in which three rubber profiles are used; and FIG. 2 is a fragmentary, cross-sectional view of a modified version of the device with two rubber profiles.

Referring now to the two figures of the drawings as a whole in detail, it is seen that the device for guiding and holding a window pane in a motor vehicle is designated by reference symbols 10, 10' as a whole, in FIGS. 1 and 2, respectively. The device 10, 10' is fastened at two flanges 14 and 16 of the door of the vehicle, in a way to be explained below. The flanges of the door frame are combined into a double layer 18 which is accordingly part of the vehicle body or chassis. The essential part of the device 10 is a metal part 20, which is either an extruded aluminum profile, or an aluminum part made through the use of powder metallurgy methods. The metal profile or part 20 is used in a pre-bent shape.

The basic idea behind the invention is to install simple rubber profiles in the metal profile, which come into direct contact with the double layered flange 18 and an edge region of a window pane 12. The rubber profiles therefore assure the secure connection to the vehicle, and also serve for the exact and reliable guidance of the widow pane 12.

For this purpose, the integral or one-piece metal profile 20 has two regions which serve different functions, i.e. a clamping region 30 and a window pane guiding region 34. The clamping region 30 has an approximately U-shaped cross-section and has a relatively small opening for the insertion of the double layer flange 18. Furthermore, the clamping region 30 of the metal profile 20 has inwardly projecting ribs 30a, 30a' with shoulders in vicinity of the insertion opening, which point to the bottom of the U-shaped profile, i.e. the bottom leg of the U.

A U-shaped rubber profile 21 which at least at its inner surface has securing lips 24a, 24b and 24c, is inserted into the clamping region 30 of the metal profile 20. The dimensions of the rubber profile 21 are coordinated with the dimensions of the U-shaped clamping region 30, so that both side legs of the U-shaped rubber profile 21 are locked in the clamping region 30 by the ribs 30a, 30a' and the shoulders thereof. The bottom of the U-shaped rubber profile 21 is obliquely slit toward the outside, as indicated in FIG. 1 by reference symbol 22, so that the rubber profile 21 can be compressed, and "buttoned in" through the small opening of the clamping region 30 into the metal profile 20. A button connection is one in which a larger member is pushed through and locked behind a smaller opening in another member. When the bottom of the U-shaped rubber profile 21 touches the bottom of the U-shaped clamping region 30, the upper ends of the U-shaped rubber profile 21 are held and secured by the ribs 30a, 30a'. In this state, i.e. before being mounted onto the double layer flange 18, the securing or fastening lips 24a, 24b and 24c of the rubber profile 21 have the shape shown in FIG. 1.

The side leg 32 of the U-shaped clamping region 30 which is in the lower position in FIG. 1, also serves as a transition to the window pane guiding region 34. The guiding region 34 according to FIG. 1 has three recesses for the form-locking mounting of the fastening members of two rubber profiles; a first recess formed by the leg 32 and shoulders 30b and 34a for a first foot 26c of a second rubber profile 26; a second recess formed by the shoulders 34a, 34b and a vertical surface of the region 34 for a second foot 26a of the second rubber profile 26; and a third recess formed by a shoulder 34d, a bottom surface 34c, and the shoulder 34b for a rubber plate 28. A form-locking connection is one in which parts are held in place by virtue of their shape.

The feet 26a, 26c and the rubber plate 28 are dimensioned in such a way that they can be inserted into these recesses in the compressed state, and form-lockingly held securely in these recesses.

In the embodiment according to FIG. 1, the second rubber profile 26 has a first sealing lip 26d beginning at the foot 26c, and a second sealing lip 26b beginning at the foot 26a, which are in the position indicated by the broken lines in FIG. 1 before they are mounted in the motor vehicle. The two rubber profiles 26 and 28 are also installed in the metal profile 20 before the actual assembly into the motor vehicle.

The metal profile 20 with the inserted rubber profiles 21, 26 and 28 is subsequently mounted during the final assembly of the motor vehicle on the assembly line, by sliding the double layered flange 18 into the U-shaped rubber profile 21. Due to the deformation of the fastening lips 24a, 24b and 24c in connection with the elasticity of the rubber profile 21, the rubber profile 21 and therefore also the metal profile 20, are securely fastened to the double layer flange 18, so that they are held to the frame of the door of the motor vehicle.

The inserted window pane 12 deforms the sealing lips 26d, 26b into the position shown in solid lines in FIG. 1, so that the window pane 12 is exactly guided and secured without any metal to metal contact.

FIG. 2 shows a modified version of a device 10' for guiding and holding a window pane 12 in a motor vehicle. The device 10' only differs from the construction according to FIG. 1 by the feature that the two rubber pieces 26 and 28 are made in one piece, i.e. they are formed by a single rubber profile 29 with the corresponding feet and sealing lips. A single, one-piece rubber profile 29 can also be secured by squeezing it into the respective recesses of the window pane guiding region 34 of the metal profile 20, without difficulties.

The foregoing is a description corresponding in substance to German Application No. P 33 42 362.8, filed Nov. 23, 1983, the International priority of which is being claimed for the instant application, and which is hereby made part of this application. Any material discrepancies between the foregoing specification and the aforementioned corresponding German application are to be recolved in favor of the latter.

I claim:

1. Device for guiding and holding a window pane in an opening formed in a body of a motor vehicle having a projection at the opening, comprising a one-piece metal profile having an S-shaped cross section formed of first and second oppositely directed U-shaped clamping regions, a first U-shaped bent rubber profile disposed in said first U-shaped clamping region for at least partially surrounding the projection, and at least one second rubber profile disposed in said second U-shaped clamping region for guiding and at least partially surrounding the window pane.

2. Device according to claim 1, wherein said second U-shaped clamping region has at least one recess formed therein in which said second rubber profile is disposed.

3. Device according to claim 1, wherein said metal profile is an extruded aluminum profile.

4. Device according to claim 1, wherein said metal profile is an extruded aluminum profile produced by a powder metallurgy process.

5. Device according to claim 1, wherein said first U-shaped clamping region and said first rubber profile have interlocking U-shaped contours, and said first rubber profile has deformable fastening lips formed thereon.

6. Device according to claim 1, wherein said U-shaped clamping region and said first rubber profile are form-lockingly interconnected, and said first rubber profile is also U-shaped and has deformable fastening lips formed thereon.

7. Device according to claim 5, wherein said first rubber profile has incisions formed therein facilitating insertion into said U-shaped clamping region.

8. Device according to claim 1, wherein the window pane has an edge region having inner, outer and side portions, said second U-shaped clamping region has two recesses formed therein locking said at least one second rubber profile in place, and said at least one second rubber profile has two sealing lips formed thereon each making contact with a respective one of the portions of the window pane.

9. Device according to claim 1, wherein the window pane has an edge region having inner, outer and side portions, said second U-shaped clamping region has two recesses formed therein form-locking said at least one second rubber profile in place, and said at least one second rubber profile has two sealing lips formed thereon each making contact with a respective one of the portions of the window pane.

10. Device according to claim 8, wherein said second U-shaped clamping region has a third recess formed therein, and said at least one second rubber profile is formed in one piece and has a rubber plate locked in said third recess and bearing against the outer portion of the window pane.

11. Device according to claim 8, wherein said second U-shaped clamping region has a third recess formed therein, and said at least one second rubber profile is formed in one piece and has a rubber plate form-lockingly disposed in said third recess and bearing against the outer portion of the window pane.

12. Device according to claim 8, wherein said second U-shaped clamping region has a third recess formed therein, and said at least one second rubber profile is in the form of two profiles including a plate-shaped rubber part locked in said third recess and bearing against the outer portion of the window pane.

13. Device according to claim 8, wherein said second U-shaped clamping region has a third recess formed therein, and said at least one second rubber profile is in the form of two profiles including a plate-shaped rubber part form-lockingly disposed in said third recess and bearing against the outer portion of the window pane.

* * * * *